United States Patent Office

2,831,899
Patented Apr. 22, 1958

2,831,899

PROCESS OF PRODUCING 2-METHYL-3-PHYTYL-1,4-NAPHTHOHYDROQUINONE

Norman L. Wendler, Summit, N. J., assignor to Merck & Co., Inc., Rahway, N. J., a corporation of New Jersey No Drawing. Application January 12, 1954
Serial No. 403,639

4 Claims. (Cl. 260—625)

This invention relates to vitamin $K_1$. More particularly, this invention is concerned with an improved process of producing 2-methyl-3-phytyl-1,4-naphthohydroquinone which is a useful intermediate in the synthesis of vitamin $K_1$.

In the best method known to date for the production of vitamin $K_1$, 2-methyl-1,4-naphthohydroquinone is reacted with phytol at about 80° C. for about 36 to 48 hours in the presence of oxalic acid to produce 2-methyl-3-phytyl-1,4-naphthohydroquinone which is subsequently oxidized to 2-methyl-3-phytyl-1,4-naphthoquinone (vitamin $K_1$). This reaction not only requires an undesirably long reaction period of about 48 hours at 75–80° C. which seriously limits output but prevents other uses of equipment employed in the reaction. Most serious however, is the low yield obtained in this reaction which seldom exceeds about 25% of the desired product.

An ultimate object of this invention is to provide an improved method of producing 2-methyl-3-phytyl-1,4-naphthohydroquinone. Other objects will appear from the following description of the invention.

It has now been discovered according to the present invention that by reacting 2-methyl-1,4-naphthohydroquinone with phytol in the presence of a heterogeneous acidic catalyst there is produced 2-methyl-3-phytyl-1,4-naphthohydroquinone in greatly increased yields in a short reaction time. Thus, by effecting this condensation in the presence of a heterogeneous acidic catalyst the reaction time is reduced from about 48 hours to about 6 hours or less. Besides reducing the reaction time the process of this invention consistently gives yields of the desired reaction product which are essentially two times larger than those previously attained. Yields by the prior art method described above usually average about 25% whereas with the novel process of this invention yields of 50% or more are realized. In addition to these advantages the production of undesirable side products is reduced to a minimum.

To obtain the advantages of this novel process it is essential that an acidic catalyst be used which is substantially insoluble, i. e. heterogeneous, in the reaction medium, has a pH of about 2 to 4.5 in water and which will not form esters with phytol. Catalysts which do not have these properties may bring about the reaction but the time required is unduly long and the desired product is ordinarily obtained in yields of about 25% at most. Included among the catalysts which are considered suitable for effecting this reaction are alkali metal bisulfates such as sodium bisulfate and potassium bisulfate.

Reaction between the 2-methyl-1,4-naphthohydroquinone and phytol is conveniently effected by contacting the reactants and catalyst in the presence of a suitable reaction medium at an elevated temperature. Broadly, any inert organic solvent in which the reactants are soluble may be used although a solvent which normally boils above the reaction temperature is preferred. However, it is essential that a solvent be employed in which the catalyst is substantially insoluble. Solvents such as benzene, toluene, dioxane and ethylene glycol dimethyl ether are examples of suitable reaction media in which the condensation may be carried out.

This reaction is readily effected at temperatures of about 65–90° C. By carefully controlling the temperature within the range of about 70–85° C. optimum conditions in terms of time and yield are realized. Within the range of 70–85° C. a reaction time of 1 to 3 hours is entirely adequate whereas with lower temperatures reaction times up to 6 hours are sometimes required. At higher temperatures the reaction goes to completion much quicker, often in about 15 minutes, but it is more difficult to control.

The quantity of reactants is not critical but it has been found advantageous to use an excess of 2-methyl-1,4-naphthohydroquinone and preferably at least two and up to 10 moles of this reactant to each mole of phytol. Excess starting material may be recovered by ordinary methods after the reaction has been completed. The catalyst may be employed in any concentration suitable for promoting the reaction but to insure maximum reaction, large amounts should be utilized.

Following completion of the reaction the desired 2-methyl-3-phytyl-1,4-naphthohydroquinone is recovered according to known procedures. Thus, according to one typical isolation procedure the reaction mixture may be filtered to remove the catalyst, the filtrate diluted with either and extracted with 2% aqueous potassium hydroxide containing sodium hydrosulfite to remove excess starting material. The resulting ethereal extract is then evaporated under reduced pressure to a small volume and triturated with petroleum ether, the resulting petroleum ether solution is extracted with Claisen's alkali and the aqueous alkaline extract is diluted with 3% aqueous sodium hydrosulfite. By extracting this solution with ethyl ether and evaporating the ether under reduced pressure there is obtained purified 2-methyl-3-phytyl-1,4-naphthohydroquinone.

The following examples are included to illustrate the invention but it is understood that the invention is not to be limited to the specific embodiments therein disclosed.

*Example 1*

To 16.0 ml. of dioxane is added 1.483 g. of phytol, 10.0 of 2-methyl-1,4-naphthohydroquinone and 3.02 g. of ground potassium acid sulfate. After partial solution of the organic compounds is effected the mixture is heated at about 75° C. for one hour and twenty minutes in an inert atmosphere. After cooling to room temperature the catalyst is removed by filtration. The filtrate is diluted with ethyl ether and the resulting solution is extracted with 2% aqueous potassium hydroxide containing 5% sodium hydrosulfite. The organic layer is evaporated to a small volume and 100 ml. of low boiling petroleum ether is added to the residue. The petroleum ether solution is extracted with 15 ml. of Claisen's alkali containing sodium hydrosulfite and the alkaline extract is diluted with aqueous sodium hydrosulfite. The desired 2-methyl-3-phytyl-1,4-naphthohydroquinone is isolated by extracting the alkaline solution with ether and removing the ether under reduced pressure.

*Example 2*

1 g. of phytol, 8 g. of 2-methyl-1,4-naphthohydroquinone and 3 g. of sodium acid sulfate is added to 20 ml. of toluene and the mixture stirred well. After heating the mixture for 2 hours at 80° C. it is cooled to room temperature and filtered. The ether solution is filtered and extracted with 2% aqueous potassium hydroxide containing about 2% sodium hydrosulfite. The ethereal solution is evaporated, the residue is added to 80 ml. of petroleum ether and the petroleum ether solution is extracted with 10 ml. of Claisen's alkali. The alkaline extract is diluted with 40 ml. of 5% aqueous sodium hydrosulfite and extracted with ether. The ether is evaporated under reduced pressure to separate 2-methyl-3-phytyl-1,4-naphthohydroquinone.

Various changes and modifications of the invention can be made and to the extent that such variations incorporate the spirit of this invention, they are intended to be included within the scope of the appended claims.

What is claimed is:

1. The process which comprises reacting 2-methyl-1,4-naphthohydroquinone with phytol in the presence of an alkali metal bisulfate in an inert organic solvent in which the reactants are soluble and in which the catalyst is substantially insoluble, to produce 2-methyl-3-phytyl-1,4-naphthohydroquinone.

2. The process which comprises reacting 2-methyl-1,4-naphthohydroquinone with phytol in the presence of potassium bisulfate at a temperature of about 65 to 90° C. in an organic solvent in which the reactants are soluble and in which the catalyst is substantially insoluble, to produce 2-methyl-3-phytyl-1,4-naphthohydroquinone.

3. The process which comprises reacting 2-methyl-1,4-naphthohydroquinone with phytol in the presence of sodium bisulfate at a temperature of about 65 to 90° C. in an inert organic solvent in which the reactants are soluble and in which the catalyst is substantially insoluble, to produce 2-methyl-3-phytyl-1,4-naphthohydroquinone.

4. The process which comprises reacting 2-methyl-1,4-naphthohydroquinone with phytol in dioxane in the presence of potassium acid sulfate at a temperature of about 65 to 90° to produce 2-methyl-3-phytyl-1,4-naphthohydroquinone.

References Cited in the file of this patent

UNITED STATES PATENTS

| | | |
|---|---|---|
| 2,140,782 | Arnold et al. | Dec. 20, 1938 |
| 2,683,176 | Isler et al. | July 6, 1954 |

OTHER REFERENCES

Kresman: Research, May 1952, pp. 212–219 (p. 217 applied).

Sabatier: Catalysis in Organic Chemistry, p. 24.